: US008594456B2

United States Patent
Yang et al.

(10) Patent No.: US 8,594,456 B2
(45) Date of Patent: Nov. 26, 2013

(54) IMAGE DENOISING METHOD

(75) Inventors: Shu Sian Yang, Hsin-Chu (TW); Chuan Hsin Lee, Hsin-Chu (TW); Wen Han Yao, Hsin-Chu (TW)

(73) Assignee: Pixart Imaging Inc, Hsin-Chu County (TW)

( * ) Notice: Subject to any disclaimer, the term of this patent is extended or adjusted under 35 U.S.C. 154(b) by 214 days.

(21) Appl. No.: 12/829,447

(22) Filed: Jul. 2, 2010

(65) Prior Publication Data

US 2011/0069904 A1 Mar. 24, 2011

(30) Foreign Application Priority Data

Sep. 21, 2009 (TW) .............................. 98131742 A (51) Int. Cl.
*G06K 9/40* (2006.01)
*G06K 9/38* (2006.01)
(52) U.S. Cl.
USPC ............ 382/275; 382/260; 382/270; 382/274
(58) Field of Classification Search
USPC ........................... 382/254, 260–264, 270–275
See application file for complete search history.

(56) References Cited

U.S. PATENT DOCUMENTS

| 7,251,056 | B2 * | 7/2007 | Matsushima | 358/1.9 |
| 2006/0203914 | A1 * | 9/2006 | Tsai et al. | 375/240.16 |
| 2007/0297694 | A1 * | 12/2007 | Kurata | 382/284 |
| 2008/0151101 | A1 * | 6/2008 | Tian et al. | 348/448 |
| 2008/0298702 | A1 * | 12/2008 | Gunupudi et al. | 382/251 |
| 2009/0016646 | A1 * | 1/2009 | Chen et al. | 382/300 |
| 2009/0144053 | A1 * | 6/2009 | Tamura et al. | 704/207 |
| 2009/0175557 | A1 * | 7/2009 | Lankoande et al. | 382/275 |

OTHER PUBLICATIONS

Benazza-Benyahia et al. "Building Robust Wavelet Estimators for Multicomponent Images Using Stein's Principle" IEEE, No. 11, 2005, pp. 1814-1830.*
Buades, Antoni et al. "A non-local algorithm for image denoising" CVPR2005.
Azzabou, Noura et al. "Image denoising based on adapted dictionary computation" ICIP2007.

* cited by examiner

*Primary Examiner* — Bernard Krasnic
*Assistant Examiner* — Weiwen Yang (57) ABSTRACT

An image denoising method according to the present invention includes the steps of: sequentially selecting a pixel in an image as a current pixel; dynamically determining a current search block and a strength parameter; transferring the comparison block of each pixel in the current search block to a frequency domain; determining a current frequency basis; obtaining a similarity between each neighborhood pixel and the current pixel in the current search block according to the current frequency basis; determining a weighting of each neighborhood pixel related to the current pixel according to the strength parameter, and a distance and the current pixel in the current search block; and weighted averaging each neighborhood pixel and the current pixel in the current search block according to the weighting so as to obtain a reconstruction value of the current pixel.

15 Claims, 8 Drawing Sheets

IMAGE DENOISING METHOD

CROSS REFERENCE TO RELATED APPLICATION

This application claims the priority benefit of Taiwan Patent Application Serial Number 098131742 filed Sep. 21, 2009, the full disclosure of which is incorporated herein by reference.

BACKGROUND OF THE INVENTION

1. Field of the Invention

The present invention relates to an image processing method, and more particularly, to an image denoising method.

2. Description of the Related Art

Image noise is one of critical issues to the quality of an image. However, when the pixel number of an image sensor is increased, the size of a pixel is gradually reduced under the consideration of cost. This causes the noise in the images captured by the image sensor to be amplified inevitably. Therefore, the performance of denoising will gradually be a critical factor in determining the quality of an image.

Figure 1:
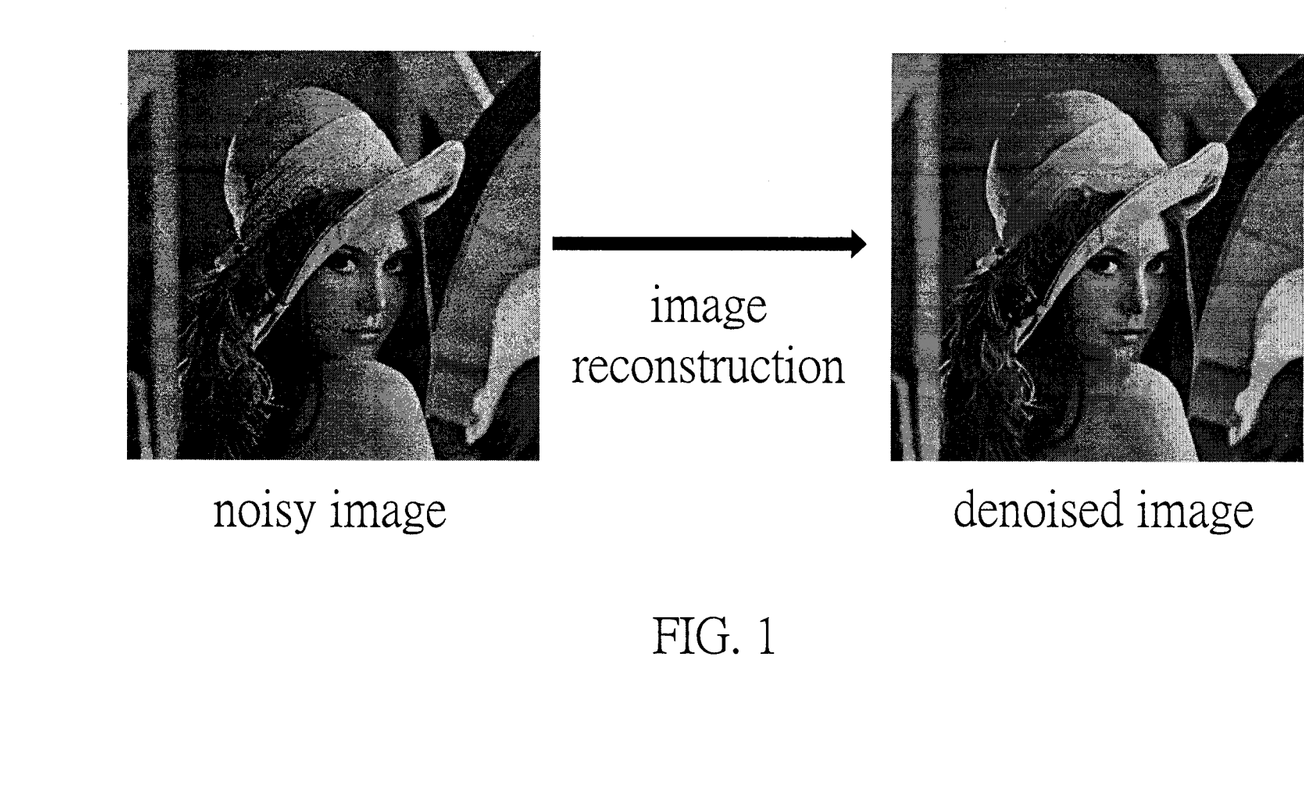
FIG. 1 illustrates a noisy image and a denoised image reconstructed from the noisy image

The method of reconstructing a noisy image to be a denoised image by a filter is named as image reconstruction. FIG. 1 illustrates a noisy image and a denoised image reconstructed from the noisy image. It will be understood that the image reconstruction can be carried out through a processing unit. In general, the processing unit is coupled to a storing unit, which is configured to temporarily store the information arisen in the course of image reconstruction.

Figure 2:
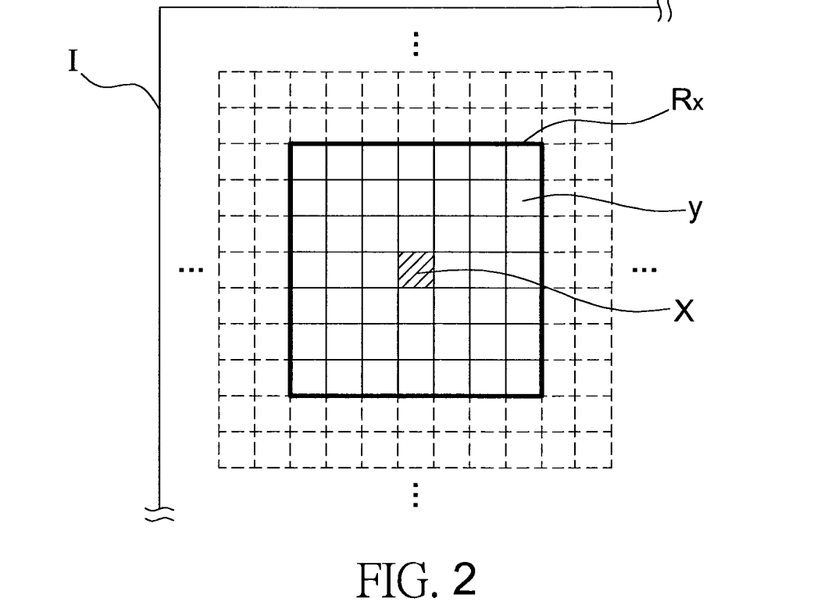
FIG. 2 is a schematic view of a conventional neighborhood filtering.

Using a neighborhood filter to carry out the image reconstruction is one of the standard techniques. The neighborhood filter determines a weighting according to a similarity between a current pixel and the neighborhood pixels thereof. Afterward, a reconstruction value of the current pixel is obtained by weighted averaging the current pixel and the neighborhood pixels according to the weighting. When all pixels in the noisy image are subjected to the above image reconstruction, a denoised image is obtained. Such a neighborhood filter can be expressed as:

$$\hat{U}(x) = \frac{1}{N_h(x)} \int\int_{R_x} h(x,y) U(y) dy \quad (1)$$

where U is the noisy image, $N_h(x)$ is the normalization constant, $\hat{U}$ is the reconstructed image and $R_x$ is a local neighborhood associated to x. The filtering function h is a monotonically decreasing and depends on the photometric distance between the pixel x and its neighborhood pixel y, for example, on the distance and intensity difference between the current pixel x and the neighborhood pixel y. Referring to FIG. 2, it illustrates a 7×7 neighborhood filtering. An image sensor captures an image I, which is a noisy image. A neighborhood filter will obtain forty-eight (48) weightings according to similarities between a current pixel x and its 48 neighborhood pixels y within the search block $R_x$ around the current pixel x. Afterward, the reconstruction value of the current pixel x is obtained by weighted averaging the gray level of the current pixel x and the gray levels of the 48 neighborhood pixels y according to the weightings. However, the above reconstruction value is obtained by the neighborhood filter according to only the weighted average of the similarities between the pixels. The reconstruction result is always unsatisfactory.

Therefore, a so-called non-local algorithm is submitted to improve the above image reconstruction method. The non-local algorithm is first to determine a weighting according to the similarity between a predetermined-sized current pixel comparison block around a current pixel and a predetermined-sized neighborhood pixel comparison block around one of its neighborhood pixels. The non-local algorithm then obtains the reconstruction value of the current pixel by weighted averaging the gray level of the current pixel and the gray levels of the neighborhood pixels according the weighting. Such non-local algorithm can be expressed as:

$$NL[v](i) = \sum_{j \in R_x} \omega(i,j) v(j) \quad (2)$$

where NL[v](i) is the reconstruction value of a current pixel i, v(j) is the gray level of one of its neighborhood pixels j before denoised, $\omega(i,j)$ is a weighting of the current pixel i and neighborhood pixel j, which determines the similarity between the predetermined-sized current pixel comparison block around the current pixel i and the predetermined-sized neighborhood pixel comparison block around a neighborhood pixel j. The weighting can be expressed as:

$$\omega(i,j) = \frac{1}{Z(i)} e^{-\frac{\|v(N_i)-v(N_j)\|_{2,a}^2}{h^2}} \quad (3)$$

where $\|v(N_i)-v(N_j)\|_{2,a}^2$ is the square of the difference between the gray levels of the predetermined-sized current pixel comparison block around the current pixel i and the predetermined-sized neighborhood pixel comparison block around a neighborhood pixel j, and Z(i) is the normalization constant.

Figure 3:
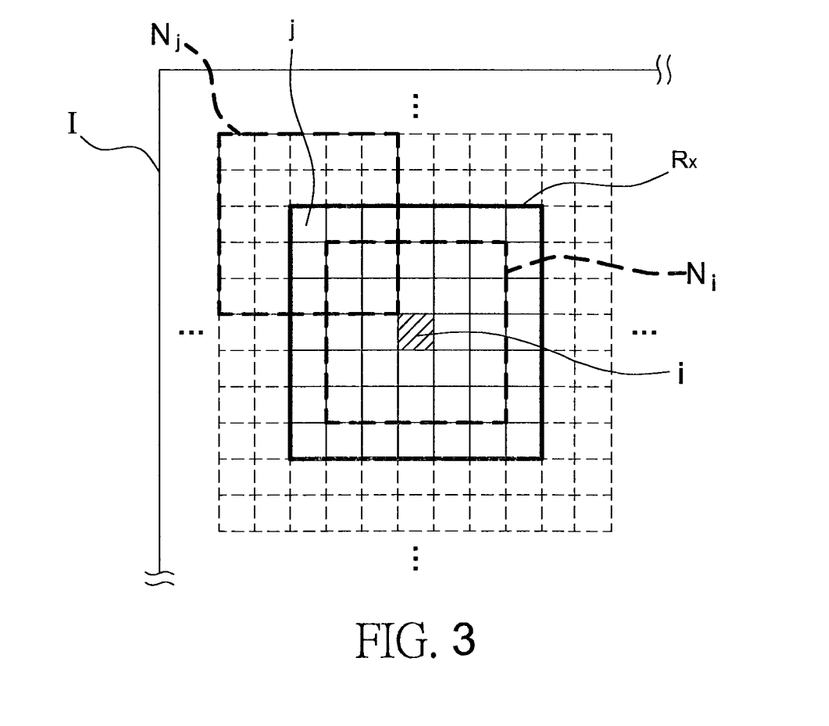
FIG. 3 is a schematic view of a conventional non-local algorithm.

Referring to FIG. 3, it illustrates the non-local algorithm that use a 7×7 search block Rx and a 5×5 comparison block (Ni, Nj), where the image I is a noisy image captured by an image sensor, i is a current pixel, Ni is the predetermined-sized (5×5) current pixel comparison block around the current pixel i, j is a neighborhood pixel of the current pixel i, Nj is the predetermined-sized neighborhood pixel comparison block around the neighborhood pixel j, and Rx is a search block. According to FIG. 3, the weighting between a current pixel i and a neighborhood pixel j depends on the sum of the squares of the twenty-five (25) differences between the pixels in the current pixel comparison block Ni and the corresponding pixels in the neighborhood pixel comparison block Nj. Therefore, forty-eight (48) weightings associated to the search block Rx can be obtained. The reconstruction value of the current pixel i is obtained by weighted averaging the gray levels of the current pixel i and neighborhood pixel j according to the weightings.

In comparison with the neighborhood filtering, the non-local algorithm can be used to obtain satisfied denoising images. However, since the noise can influence the pixels, the non-local algorithm of directly computing the gray levels for two comparison blocks can still not remove all noise in the reconstructed image. In order to improve the above non-local algorithm, the algorithm is slightly modified that the comparison block is first transformed to frequency domain and then the comparison is executed. This is because the noise commonly has dominant high-frequency components in frequency domain. Therefore, the noise can be easily filtered out in frequency-domain before the comparison is executed. However, the above method cannot dynamically adjust related parameters for the characteristics of each pixel. This will lead to poor result of details and being very subject to shock effect or staircasting effect.

The above image reconstruction methods can be referred to the CVPR2005, entitled "A non-local algorithm for image denoising" to Antoni Buades et al. and to the ICIP2007, entitled "Image denoising based on adapted dictionary computation" to Noura Azzabou et al.

In view of the above, the present invention provides an image denoising method that can dynamically adjust the denoising strength, size of search blocks and size of comparison blocks according to the complexity of image so as to conserve much more image details and eliminate the side effect occurred in the conventional methods.

SUMMARY OF THE INVENTION

The present invention provides an image denoising method that can dynamically adjust the size of search blocks and size of comparison blocks according to the complexity of the image around the current pixel. In addition, the method of present invention can conserve much more image details.

It is one object of the present invention to provide an image denoising method that is suitable for the transformations of various frequencies.

It is another object of the present invention to provide an image denoising method that can dynamically adjust the denoising strength of the pixels according to the complexity of image.

The present invention provides an image denoising method, comprising the steps of: sequentially selecting a pixel in an image as a current pixel, wherein the pixels around the current pixel are defined as neighborhood pixels; dynamically determining a current search block enclosing the current pixel and a strength parameter and determining a comparison block for each of the pixels in the current search block, wherein the comparison block encloses the each pixel; transforming the comparison block for each of the pixels in the current search block to a frequency domain to form a frequency-domain comparison block; determining a current frequency basis for the frequency-domain comparison block; obtaining a similarity between each of the neighborhood pixels and the current pixel in the current search block according to the current frequency basis; determining a weighting for each of the neighborhood pixels related to the current pixel according to the strength parameter, the similarity and a distance between each of neighborhood pixels and the current pixel in the current search block; and weighted averaging each of the neighborhood pixels and the current pixel in the current search block according to the weighting to obtain a reconstruction value of the current pixel.

According to the image denoising method of the present invention, wherein one embodiment of dynamically determining a current search block enclosing the current pixel and a strength parameter comprises: determining a maximal search block enclosing the current pixel and a comparison block for each of the pixels in the maximal search block, wherein the comparison block encloses the each pixel; calculating a concentration degree of frequency parameter for the maximal search block; and determining the current search block and the strength parameter according to the concentration degree of frequency parameter.

According to the image denoising method of the present invention, wherein one embodiment of calculating a concentration degree of frequency parameter for the maximal search block comprises: transforming the comparison blocks for all the pixels in the maximal search block to frequency domain to form frequency-domain comparison blocks; adding up a predetermined number of largest energy sums of different frequencies for the predetermined number of frequencies, and then dividing the added energy sums by the total sum of the energy sums for all the frequencies to obtain a quotient of energy sum; and comparing the quotient of energy sum with a threshold value to determine the concentration degree of frequency parameter.

The present invention further provides an image denoising method, comprising the steps of: sequentially selecting a pixel in an image as a current pixel, wherein the pixels around the current pixel are defined as neighborhood pixels; determining a maximal search block enclosing the current pixel and a comparison block for each of the pixels in the maximal search block, wherein the comparison block encloses the each pixel; transforming the comparison blocks for all the pixels in the maximal search block to frequency domain to form frequency-domain comparison blocks; calculating a ratio of edge pixels in the maximal search block; determining a current search block and a strength parameter according to the ratio of the edge pixels and determining a current frequency basis for the current search block; obtaining a similarity between each of the neighborhood pixels and the current pixel in the current search block according to the current frequency basis; determining a weighting for each of the neighborhood pixels related to the current pixel according to the strength parameter, the similarity and a distance between each of neighborhood pixels and the current pixel in the current search block; and weighted averaging each of the neighborhood pixels and the current pixel in the current search block according to the weighting to obtain a reconstruction value of the current pixel.

According to the image denoising method of the present invention, wherein the step of calculating a ratio of edge pixels in the maximal search block comprises: adding up a predetermined number of largest energy sums of different frequencies for the predetermined number of frequencies, and then dividing the added energy sums by the total sum of the energy sums for all the frequencies to obtain a quotient of energy sum; and comparing the quotient of energy sum with a threshold value to determine the ratio of the edge pixels According to the image denoising method of the present invention, wherein the similarity is equal to the sum of the absolute values of the differences between the energy of the each neighborhood pixel and the energy of the current pixel for each of the frequencies in the current frequency basis, or to the sum of the squares of the differences between the energy of the each neighborhood pixel and the energy of the current pixel for each of the frequencies in the current frequency basis.

According to the image denoising method of the present invention, wherein the current frequency basis are the frequencies for which the corresponding energy sums of the frequency-domain comparison blocks with the same frequency are largest for a predetermined number.

According to the image denoising method of the present invention, wherein the step of transforming the comparison block to the frequency domain is performed by discrete cosine transform, Fourier transform, wavelet transform or principle components analysis. The method of the present invention can determine a denoising strength, a size of search blocks and a size of comparison blocks according to the concentration degree of frequency parameter.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 4b is a flow chart of the step of determining a current search block and a strength parameter in FIG. 4a.

FIG. 7b is a flow chart of the step of determining a ratio of the edge pixels in FIG. 7a.

DETAILED DESCRIPTION OF THE PREFERRED EMBODIMENT

The foregoing, as well as additional objects, features and advantages of the invention will be more readily apparent from the following detailed description, which proceeds with reference to the accompanying drawings. In this invention, identical reference numerals will be used when designating substantially identical elements that are common to the figures.

Figure 4A:
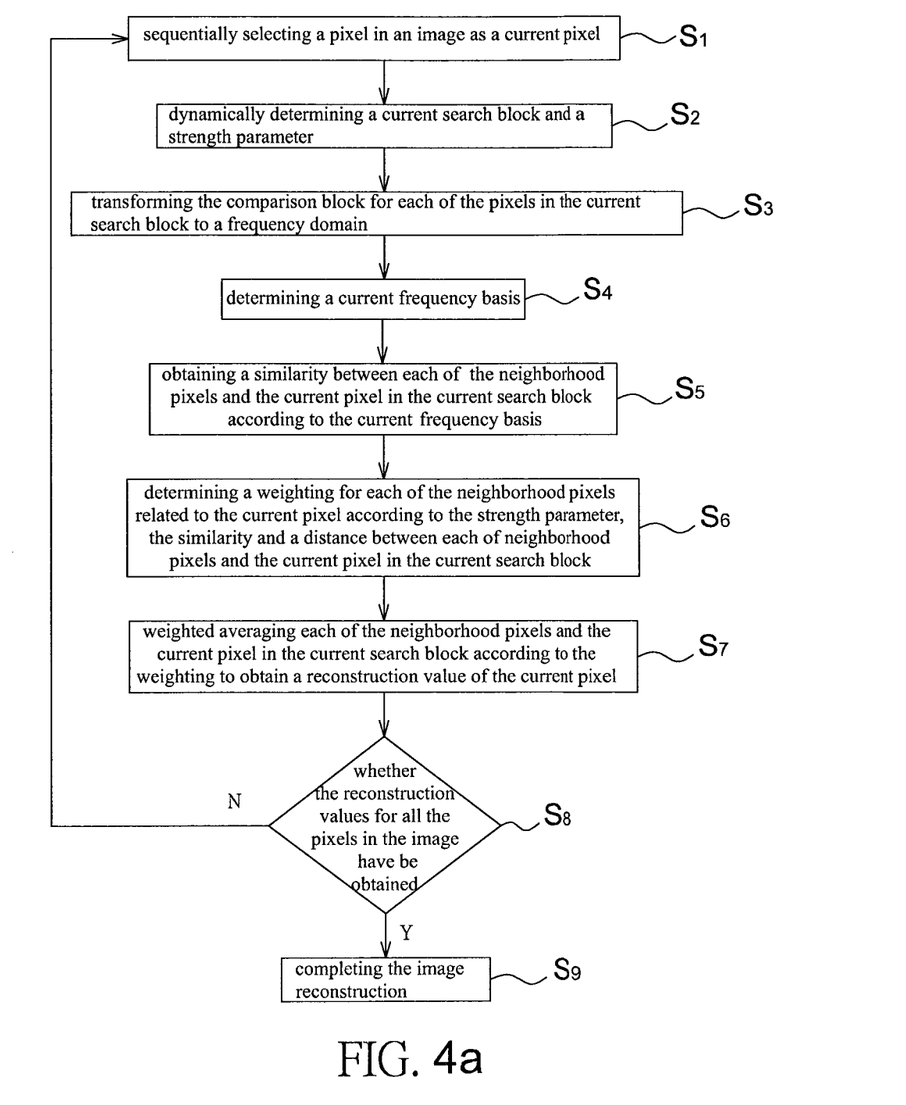
FIG. 4a is a flow chart of the image denoising method according to one embodiment of the present invention.

Referring to FIG. 4a, it illustrates the image denoising method according to one embodiment of the present invention. First, a pixel in an image is sequentially selected as a current pixel, wherein the pixels around the current pixel are defined as neighborhood pixels (step $S_1$). A current search block enclosing the current pixel and a strength parameter are then dynamically determined. In addition, a comparison block for each of the pixels in the current search block is determined, wherein the comparison block encloses the each pixel (step $S_2$). Afterward, the comparison block for each of the pixels in the current search block is transformed to a frequency domain to form a frequency-domain comparison block (step $S_3$). A current frequency basis for the frequency-domain comparison blocks is determined (step $S_4$). A similarity between each of the neighborhood pixels and the current pixel in the current search block is obtained according to the current frequency basis (step $S_5$). A weighting for each the neighborhood pixel related to the current pixel is determined according to the strength parameter, the similarity and a distance between each of the neighborhood pixels and the current pixel in the current search block (step $S_6$). Subsequently, a reconstruction value for the current pixel is obtained by weighted averaging each the neighborhood pixel and the current pixel in the current search block according to the weighting (step $S_7$). Finally, whether the reconstruction values for all the pixels in the image have been obtained is determined (step $S_8$). If yes, the reconstruction for the image is completed. If not, the procedure will go back to step $S_1$.

Figure 4B:
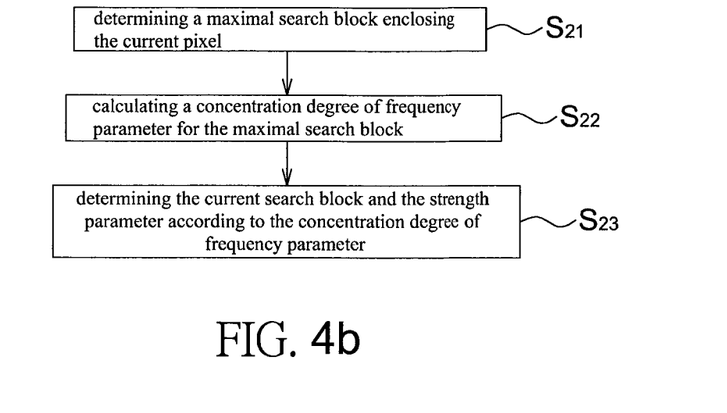

Referring to FIG. 4b, it illustrates one embodiment for the step of dynamically determining a current search block and a strength parameter in the step $S_2$. A maximal search block enclosing the current pixel is determined and a comparison block for each of the pixels in the maximal search block is determined, wherein the comparison block encloses the each pixel (step $S_{21}$). A concentration degree of frequency parameter for the maximal search block is calculated (step $S_{22}$). The current search block and the strength parameter is determined according to the concentration degree of frequency parameter (step $S_{23}$).

Figure 4C:
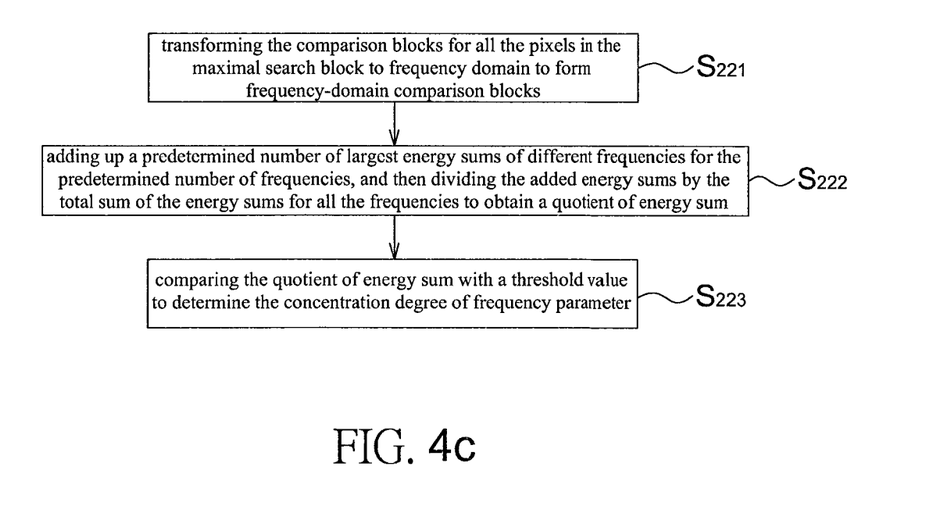
FIG. 4c is a flow chart of the step of calculating a concentration degree of frequency parameter in FIG. 4b.

Referring to FIG. 4c, it illustrates one embodiment for the step of calculating the concentration degree of frequency parameter in the step $S_{22}$. The comparison blocks for all the pixels in the maximal search block are transformed to frequency domain to form frequency-domain comparison blocks (step $S_{221}$). A predetermined number of largest energy sums of different frequencies for the predetermined number of frequencies are added up. The added energy sums divides by the total sum of the energy sums for all the frequencies to obtain a quotient of energy sum (step $S_{222}$). The quotient of the energy sum is compared with a threshold value so as to determine the concentration degree of frequency parameter (step $S_{223}$).

Afterward, the image denoising method according to the present invention will be described in detail in the following paragraphs. The image denoising method of the present invention is used to reconstruct a noisy image to be a denoised image, as shown in FIG. 1. It will be understood that the above steps for image reconstruction can be carried out through a processing unit. The processing unit is coupled to a storing unit to access the information arisen in the course of image reconstruction.

Figure 5:
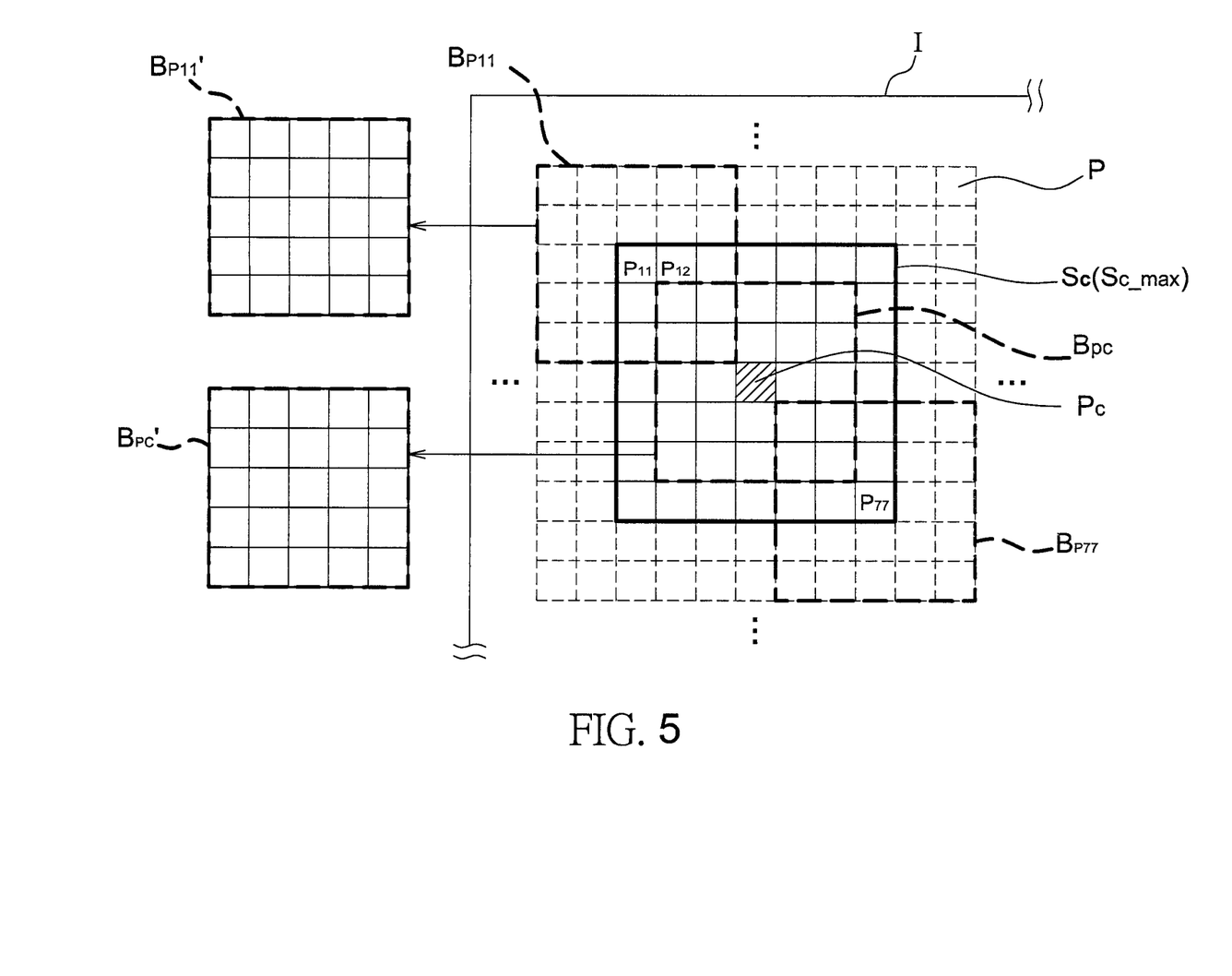
FIG. 5 is a schematic view of the image denoising method according to the present invention.

Referring to FIG. 5, a noisy image I includes a plurality of pixels P arranged in a matrix and each of the pixels P has a gray level. The size of the noisy image I can be determined by application. The image denoising method of the present invention is to obtain reconstructed gray levels for all the pixels in the noisy image I and then to form a denoised image according to the reconstructed gray levels.

Referring to FIGS. 4a and 5 again, the image denoising method of the present invention can first calculate the reconstructed gray level for a first pixel in one of the corners of the noisy image I and then sequentially obtain the reconstructed gray levels for the other pixels in the noisy image I. According to the present invention, a pixel is processed now is named as a current pixel Pc and the pixels around the current pixel Pc are defined as neighborhood pixels related to the current pixel Pc, which can called as $P_{11}$, $P_{12}$, ..., $P_{77}$ (step $S_1$).

Afterward, a current search block Sc enclosing the current pixel Pc and a strength parameter are dynamically determined (step $S_2$). In the present invention, the size of the current search block Sc is dynamically determined according to the complexity of the image around the current pixel Pc. The higher the complexity is, the smaller the size of the current search block Sc is. The lower the complexity is, the larger the size of the current search block Sc is. According to the present invention, the performance for image denoising can be enhanced by selecting different sizes of the current search blocks Sc. The strength parameter is used for the subsequent steps and configured to determine the image denoising strength (described in the following paragraphs). In the step $S_2$, a comparison block B for each of the pixels P in the current search block Sc is simultaneously determined, wherein the comparison block B encloses the each pixel P. For example, the comparison block $B_{p11}$ is for the pixel $P_{11}$ and the comparison block $B_{p77}$ is for the pixel $P_{77}$. These comparison blocks $B_{p11}$-$B_{p77}$ has a size of 5×5. Therefore, when a current search block Sc has a size of 7×7, it includes 49 pixels $P_{11}$-$P_{77}$ and Pc, and the comparison blocks $B_{p11}$-$B_{p77}$ and Bpc enclosing these pixels are then determined. It will be understood that the sizes of the current search block Sc and comparison blocks B are not limited to the above description.

Referring to FIGS. 4b and 5 again, one embodiment for determining the size of the current search block Sc and the strength of the strength parameter will be described in the following paragraphs. When a current pixel Pc is selected (step $S_1$), a maximal search block Sc_max enclosing the current pixel Pc is first determined. The size of the maximal search block Sc_max is, for example, 7×7 (step $S_{21}$). A comparison block for each of the pixels in the maximal search block Sc_max is also determined and has a size of, for example, 5×5. For example, a comparison block $B_{p11}$ enclosing the pixel $P_{11}$ is determined and a comparison block Bpc enclosing the current pixel Pc. Afterward, the comparison blocks for all the pixels in the maximal search block Sc_max are transformed to frequency domain to form frequency-domain comparison blocks. For example, the comparison block $B_{p11}$ is transformed to the comparison block $B_{p11}'$ and the comparison block Bpc is transformed to the comparison block Bpc'. Similarly, the remaining 47 comparison blocks associated to the maximal search block Sc_max are also transformed to frequency-domain comparison blocks. The method for transforming to the frequency domain can be discrete cosine transform, Fourier transform, wavelet transform or principle components analysis.

Afterward, a concentration degree of frequency parameter for the maximal search block is calculated (step $S_{22}$) and the embodiment thereof will be described in the following paragraphs. In the present invention, the concentration degree of frequency parameter for the maximal search block is equivalent to the ratio of the edge pixels in the maximal search block Sc_max. The way to identify whether a pixel in the maximal search block is an edge pixel is described as follows: When the comparison block for the pixel is transformed to a frequency-domain comparison block, the pixel will be an edge pixel if the frequency-domain comparison block has energy concentrated within some particular frequencies. In contrast, the pixel will not be an edge pixel if the energy of the frequency-domain comparison block uniformly falls within all frequencies. Therefore, the higher the concentration degree of frequency parameter for the maximal search block is, the more edge pixels the maximal search block has. Afterward, the size of the current search block Sc and the strength of the strength parameter are determined according to the concentration degree of frequency parameter (step $S_{23}$). For example, when the concentration degree of frequency parameter (or the ratio of the edge pixels) is higher, it means that the image in the maximal search block Sc_max is more complex. Therefore, it is required to select a smaller current search block Sc and a weaker strength parameter. In contrast, when the concentration degree of frequency parameter (or the ratio of the edge pixels) is lower, it means that the change of the image in the maximal search block Sc_max is more uniform. It is therefore required to select a larger current search block Sc and a stronger strength parameter. In the present invention, the current search block Sc can have a size of 7×7, 5×5 or 3×3 according to the concentration degree of frequency parameter. However, the size of the current search block Sc is not limited to the above description. The spirit of the present invention is to determine the size of the current search block Sc and the strength of the strength parameter according to the complexity of the image around the current pixel Pc.

Referring to FIGS. 4c to 6, one embodiment for determining the concentration degree of frequency parameter will be described in the following paragraphs. In the following paragraphs, the maximal search block Sc_max is specified to have a size of 7×7 and the comparison block for each the pixel is specified to have a size of 5×5. When a certain comparison block is transformed to a frequency-domain comparison block, it comprises 25 frequencies. For example, the comparison block $B_{p11}$ of the pixel $P_{11}$ is transformed to the frequency-domain comparison block $B_{p11}'$. The frequency-domain comparison block $B_{p11}'$ comprises 25 frequencies. For example, the 25 frequencies can be numbered from frequency 1 to frequency 25. These 25 frequencies have energies $E_1^{11}$-$E_{25}^{11}$ respectively. The frequency-domain comparison block Bpc' of the current pixel Pc comprises the energies $E_1^{pc}$-$E_{25}^{pc}$ of 25 frequencies and the frequency-domain comparison block $B_{p77}'$ comprises the energies $E_1^{77}$-$E_{25}^{77}$ of 25 frequencies. In order to facilitate the description of the invention, each of the frequency-domain comparison blocks is shown as a 25-dimension array in FIG. 6, wherein the subscript of the energy E denotes the frequency number and the superscript denotes the pixel number (step $S_{221}$).

Figure 6:
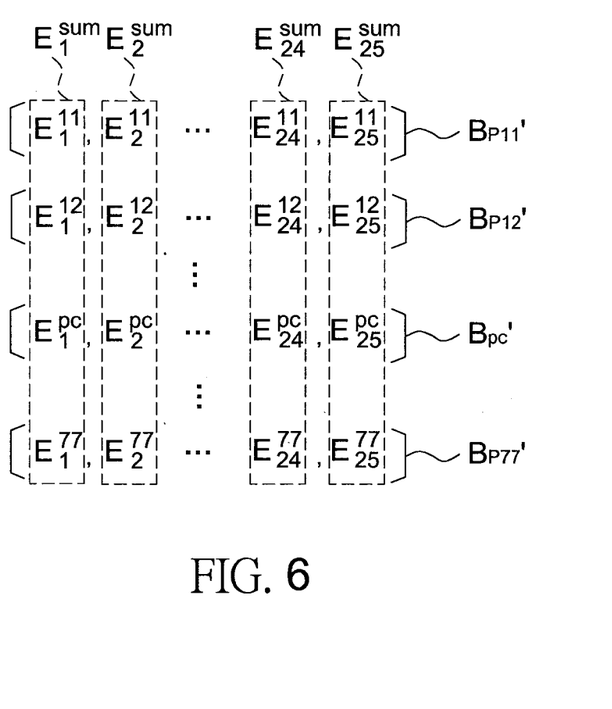
FIG. 6 is a schematic view illustrating the frequencies contained in the frequency-domain comparison block according to the image denoising method of the present invention.

The energies with the same frequencies for the frequency-domain comparison blocks Bp11'-Bp77' is added up to obtain the energy sums $E_1^{sum}$-$E_{25}^{sum}$ for different frequencies. For example, the energy sum for frequency 1 is $E_1^{sum}=E_1^{11}+\ldots+E_1^{77}, \ldots$, and the energy sum for frequency 25 is $E_{25}^{sum}=E_{25}^{11}+\ldots+E_{25}^{77}$. Afterward, for a predetermined number of frequencies, the predetermined number of largest energy sums of different frequencies is added up and defined as $E_{max}^{sum}$. The total sum of the energy sums for all frequencies can be defined as $E_{total}^{sum}$. A quotient of energy sum is then obtained by dividing the above sum of the energy sums by the total sum of the energy sums for all the frequencies, i.e. $E_{max}^{sum}/E_{total}^{sum}$ (step $S_{222}$). For example, the predetermined number is five and the largest five energy sums of different frequencies are $E_1^{sum}$, $E_3^{sum}$, $E_5^{sum}$, $E_7^{sum}$ and $E_9^{sum}$. The quotient of energy sum can then be expressed as:

$$(E_1^{sum}+E_3^{sum}+E_5^{sum}+E_7^{sum}+E_9^{sum})/\sum_{i=1}^{25}E_i^{sum}$$

Subsequently, the quotient of energy sum is compared with a predetermined threshold value. The concentration degree of frequency parameter is then determined according to the relation between the quotient of energy sum and the predetermined threshold value (step $S_{223}$). For example, when the quotient of energy sum is greater than a predetermined threshold value, it means that the image in the maximal search block Sc_max is more complex. In contrast, when the quotient of energy sum is smaller than a predetermined threshold value, it means that the change of the image in the maximal search block Sc_max is more uniform. It should be understood that the concentration degree of frequency parameter is not limited to the above description, other methods, such as statistics can also be used to calculate the distribution of the energy over frequency. In addition, it will be noted that the comparison blocks for the pixels in the current search block can also be dynamically determined according to the concentration degree of frequency parameter (the ratio of the edge pixels).

When the step $S_2$ is completed, a current search block Sc and a strength parameter can be dynamically determined according to the complexity of the image around the current pixel Pc. Afterward, the comparison block for each of the pixels in the current search block Sc is transformed to a frequency domain to form a frequency-domain comparison block (step $S_3$). The method for transforming to the frequency domain can be discrete cosine transform, Fourier transform, wavelet transform or principle components analysis. It should be understood that if the comparison blocks for the pixels in the maximal search block Sc_max have been transformed to frequency domain, these frequency-domain comparison blocks can be stored in a storing unit. Since the current search block Sc is smaller than or equal to the maximal search block Sc_max, the frequency-domain comparison blocks associated with the pixels in the current search block Sc can be directly accessed from the storing unit in the step $S_3$. There is no need to transform to frequency domain again.

Referring to FIGS. 4a, 5 and 6 again, when the comparison blocks for the pixels in a current search block Sc, such as a 7×7 search block, are transformed to frequency domain, such as 5×5 frequency-domain comparison blocks, a current frequency basis for the frequency-domain comparison blocks associated with the current search block Sc is then determined for use in the subsequent steps. Referring to FIG. 6 again, in the present invention, the current frequency basis is determined according to the frequencies of the predetermined number of largest energy sums in the total sum of the energy sums for all frequencies. This is because when the energy sum for a certain frequency is large, most of the image information in the current search block will fall within this frequency. For example, when the largest ten energy sums are $E_{10}^{sum}$-$E_{19}^{sum}$, the frequency 10 to frequency 19 (total 10 frequencies) will be the current frequency basis (step $S_4$).

Afterward, a similarity between each the neighborhood pixel and the current pixel in the current search block is obtained according to the current frequency basis (step $S_5$). To obtain the similarity between a given neighborhood pixel and the current pixel in the current search block, the similarity is equal to the sum of the absolute values of the differences between the energy of the given neighborhood pixel and the energy of the current pixel for each of the frequencies in the current frequency basis. The similarity can also be equal to the sum of the squares of the differences between the energy of the given neighborhood pixel and the energy of the current pixel for each of the frequencies in the current frequency basis. Therefore, when the sum of the absolute values of the differences or the sum of the squares of the differences is small, the similarity between a neighborhood pixel and the current pixel will be large. In contrast, when the sum of the absolute values of the differences or the sum of the squares of the differences is large, the similarity between a neighborhood pixel and the current pixel will be small. For example, the similarity between the pixel $P_{11}$ and the current pixel Pc can be expressed as:

$$(|E_{10}^{11}-E_{10}^{pc}|+|E_{11}^{11}-E_{11}^{pc}|+\ldots+|E_{19}^{11}-E_{19}^{pc}|)$$

or $$[(E_{10}^{11}-E_{10}^{pc})^2+(E_{11}^{11}-E_{11}^{pc})^2+\ldots+(E_{19}^{11}-E_{19}^{pc})^2]$$

It should be understood that the method for calculating the similarity between a neighborhood pixel and the current pixel is not limited to the above description. The energy relation for frequency between the frequency-domain comparison block of a neighborhood pixel and the frequency-domain comparison block Bpc' can be expressed in other methods. In this embodiment, similarities between 48 neighborhood pixels and the current pixel Pc can be obtained. As known, the similarity between the current pixel Pc and the current pixel Pc will be 100%.

Therefore, a weighting for each of the neighborhood pixels $P_{11}$-$P_{77}$ related to the current pixel Pc is determined according to the strength parameter, and a distance and the similarity between each of the neighborhood pixels $P_{11}$-$P_{77}$ and the current pixel Pc in the current search block (step $S_6$). When a neighborhood pixel is farther from the current pixel Pc, the weighting for the neighborhood pixel is lowered. In contrast, when a neighborhood pixel is closer to the current pixel Pc, the weighting for the neighborhood pixel is increased. When the similarity between a neighborhood pixel and the current pixel Pc is lower, the weighting for the neighborhood pixel is lowered. In contrast, when the similarity between a neighborhood pixel and the current pixel Pc is higher, the weighting for the neighborhood pixel is increased. When a weighting rate for each of the neighborhood pixels $P_{11}$-$P_{77}$ in the current search block Sc is determined according to the distance and similarity between each the neighborhood pixel and the current pixel Pc, a weighting for each of the neighborhood pixels $P_{11}$-$P_{77}$ related to the current pixel Pc is determined according to the strength parameter. When the image in the current search block Sc is complex, a low strength parameter is selected so as to lower the denoising strength. If the change of the image in the current search block Sc is uniform, a high strength parameter is selected to increase the denoising strength. The strength parameter adjusts the weighting rate according to the complexity of the image in the current search block Sc. Therefore, the strength parameter can be a mathematical function (ratio, power, log function or other functions) or a numeric value. For example, the strength parameter can be that the weighting rate multiplies by a ratio, the weighting rate to the power, the logarithm of the weighting rate or that the weighting rate adds a certain value.

When a weighting for each of the neighborhood pixels $P_{11}$-$P_{77}$ related to the current pixel Pc in the current search block Sc is obtained, the current pixel Pc and each of the neighborhood pixels $P_{11}$-$P_{77}$ is weighted averaged, e.g. by formula (2) to obtain a reconstruction value the current pixel Pc (step $S_7$) according to the weighting.

Afterward, whether the reconstruction values for all the pixels in the noisy image I have been obtained is determined (step $S_8$). When the reconstruction values for all the pixels have been obtained, the noisy image I is reconstructed and a denoised image is generated. If the reconstruction values for the pixels have not been all obtained, the procedure will go back to step $S_1$. A next pixel P in the image I will be reconstructed.

Figure 7A:
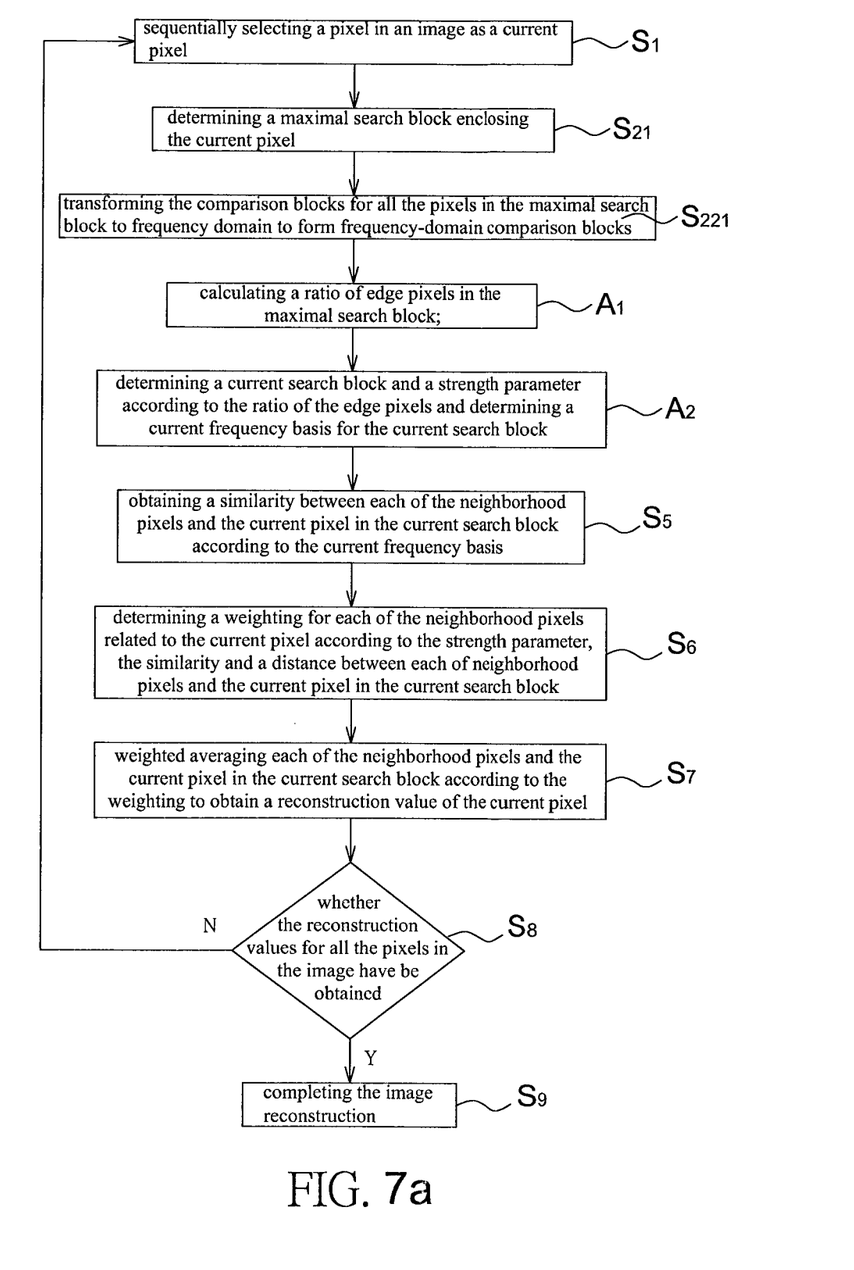
FIG. 7a is a flow chart of the image denoising method according to another embodiment of the present invention.

Referring to FIG. 7a, it illustrates the image denoising method according to another embodiment of the present invention. First, a pixel in an image is sequentially selected as a current pixel, wherein the pixels around the current pixel are defined as neighborhood pixels (step $S_1$). A maximal search block enclosing the current pixel is determined and a comparison block for each of the pixels in the maximal search block is determined, wherein the comparison block encloses the each pixel (step $S_{21}$). The comparison blocks for all the pixels in the maximal search block are transformed to frequency domain to form frequency-domain comparison blocks (step $S_{221}$). A ratio of the edge pixels in the maximal search block is calculated (step $A_1$). A current search block and a strength parameter are determined according to the ratio of the edge pixels and a current frequency basis for the current search block is determined (step $A_2$). A similarity between each of the neighborhood pixels and the current pixel in the current search block is obtained according to the current frequency basis (step $S_5$). A weighting for each the neighborhood pixel related to the current pixel is determined according to the strength parameter, and a distance and the similarity between each the neighborhood pixel and the current pixel in the current search block (step $S_6$). Subsequently, a reconstruction value for the current pixel is obtained by weighted averaging each the neighborhood pixel and the current pixel in the current search block according to the weighting (step $S_7$). Finally, whether the reconstruction values for all the pixels in the image have been obtained is determined (step $S_8$). If yes, the reconstruction for the image is completed (step $S_9$). If not, the procedure will go back to step $S_1$. In this embodiment, identical reference numerals have been used when designating identical steps that are common to FIGS. 4a-4c. In addition, as described above, the ratio of the edge pixels in the maximal search block is equivalent to the concentration degree of frequency parameter. Therefore, the step $A_1$ in FIG. 7a is similar to the step $S_{22}$ in FIG. 4b and the step $A_2$ is similar to the steps $A_{23}$ and $S_4$. This embodiment is substantially the same as the embodiment disclosed in FIGS. 4a-4c and the difference between them is only in the sequence of the steps. Thus, any further illustrations of this embodiment are omitted herein.

Figure 7B:
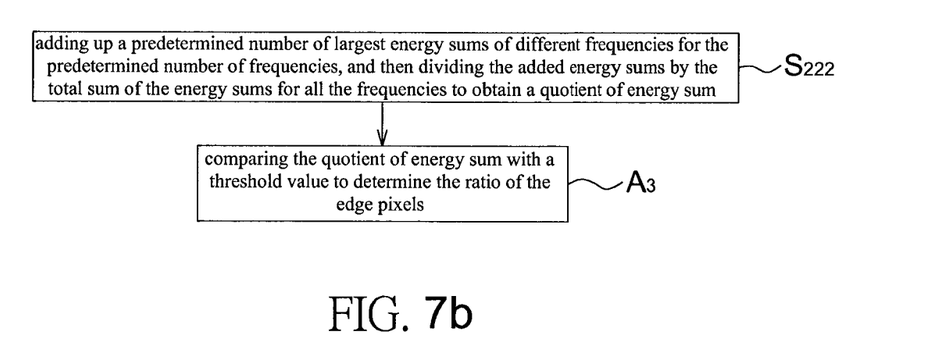

In addition, referring to FIGS. 7a and 7b, the step $A_1$ of calculating a ratio of the edge pixels in the maximal search block comprises the following steps. A quotient of energy sum is obtained by dividing the sum of the predetermined number of largest energy sums of different frequencies by the total sum of the energy sums for all the frequencies (step $S_{222}$). The quotient of energy sum is compared to a threshold value so as to determine the ratio of the edge pixels (step $A_3$). Since the ratio of the edge pixels in the maximal search block is equivalent to the concentration degree of frequency parameter, the step $A_3$ in FIG. 8b is similar to the step $S_{223}$ in FIG. 4c.

It will be noted that although the above blocks, including current search block, maximal search block, frequent-domain comparison block, search block and comparison block, are square disclosed in the embodiments, they can have any shape, such as rectangle, rhombus, circle or ellipse.

As described above, since the conventional image reconstruction methods fail to dynamically adjust parameters according to the characteristics of the pixels. This leads to poor result of details. The present invention provides an image denoising method that can dynamically adjust the denoising strength, size of search blocks and size of comparison blocks according to the complexity of image, as shown in FIGS. 4a-4c and 7a-7b. The method of present invention can conserve much more image details and eliminate the side effect occurred in the conventional methods.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An image denoising method of removing a noise from an image captured by an image sensor, the image denoising method comprising the steps of:
    sequentially selecting a pixel in the image captured by the image sensor as a current pixel, wherein pixels in the image around the current pixel are defined as neighborhood pixels of the current pixel;
    dynamically determining a current search block enclosing the current pixel and a strength parameter for defining an image denoising strength according to complexity of the same image around the current pixel;
    determining a comparison block for each of the pixels in the current search block of the same image, wherein the comparison block encloses the each of the pixels;
    transforming the comparison block for each of the pixels in the current search block of the same image to a frequency domain to form a frequency-domain comparison block;
    determining a current frequency basis for the frequency-domain comparison blocks of the same image;
    obtaining a similarity between each of the neighborhood pixels and the current pixel in the current search block according to the current frequency basis of the same image;
    determining, for each of the neighborhood pixels, a weighting related to the current pixel according to the strength parameter, the similarity and a distance between each of the neighborhood pixels and the current pixel in the current search block of the same image; and
    performing a weighted averaging for the neighborhood pixels and the current pixel in the current search block according to the weightings to obtain a reconstruction value of the current pixel of the same image, wherein
    a number of comparison blocks is same as a number of pixels in the current search block of the same image, and
    the current search block and the comparison block for each of the pixels in the current search block of the same image are at least partially overlapped with each other.

2. The image denoising method as claimed in claim 1, further comprising:
    determining whether the reconstruction values for all the pixels in the image have been obtained.

3. The image denoising method as claimed in claim 2, further comprising:
    reconstructing, when it is determined that the reconstruction values for all the pixels in the image have been obtained, a denoised image of the same image by using the reconstruction values.

4. The image denoising method as claimed in claim 1, wherein the step of transforming the comparison block to the frequency domain is performed by discrete cosine transform, Fourier transform, wavelet transform or principle components analysis.

5. The image denoising method as claimed in claim 1, wherein the current frequency basis includes a predetermined number of frequencies for which the corresponding energy sums of the frequency-domain comparison blocks are largest.

6. The image denoising method as claimed in claim 1, wherein the similarity is equal to
    the sum of the absolute values of the differences between the energy of the each neighborhood pixel and the energy of the current pixel for each of frequencies in the current frequency basis, or
    the sum of the squares of the differences between the energy of the each neighborhood pixel and the energy of the current pixel for each of frequencies in the current frequency basis.

7. The image denoising method as claimed in claim 6, wherein the concentration degree of frequency parameter for the maximal search block served as the complexity includes a ratio of edge pixels in the maximal search block.

8. The image denoising method as claimed in claim 7, wherein the edge pixels are determined based on energy of the frequency-domain comparison block.

9. The image denoising method as claimed in claim 1, wherein
    the step of dynamically determining the current search block and the strength parameter comprises:

determining a maximal search block of a first size enclosing the current pixel and a comparison block for each of the pixels in the maximal search block, wherein the comparison block encloses the each pixel of the pixels;

calculating a concentration degree of frequency parameter for the maximal search block to be served as the complexity of the same image; and determining the current search block of a second size and the strength parameter according to the concentration degree of frequency parameter, and the second size is equal to or smaller than the first size.

10. The image denoising method as claimed in claim 9, wherein the step of calculating the concentration degree of frequency parameter for the maximal search block comprises:

transforming the comparison blocks for all the pixels in the maximal search block to frequency domain to form frequency-domain comparison blocks;

adding up a predetermined number of largest energy sums of different frequencies for a predetermined number of frequencies, and then dividing the added energy sums by the total sum of the energy sums for all the frequencies to obtain a quotient of energy sum; and comparing the quotient of energy sum with a threshold value to determine the concentration degree of frequency parameter.

11. The image denoising method as claimed in claim 10, wherein the step of transforming the comparison blocks for all the pixels in the maximal search block to frequency domain is performed by discrete cosine transform, Fourier transform, wavelet transform or principle components analysis.

12. The image denoising method as claimed in claim 9, wherein the maximal search block has a 7×7 size.

13. The image denoising method as claimed in claim 9, wherein when the concentration degree of frequency parameter is higher, the image in the maximal search block is more complex, and the strength parameter is weaker and the current search block is smaller, and when the concentration degree of frequency parameter is lower, the image in the maximal search block is more uniform, and the strength parameter is stronger and the current search block is larger.

14. The image denoising method as claimed in claim 13, wherein the size of the current search block is one selected from the group consisting of 7×7, 5×5 and 3×3 according to the concentration degree of frequency parameter.

15. The image denoising method as claimed in claim 1, wherein the current search block, comparison block and frequency-domain comparison block have a shape of square, rectangle, rhombus, circle or ellipse.

* * * * *